United States Patent
Delaplace et al.

(10) Patent No.: US 9,457,888 B2
(45) Date of Patent: Oct. 4, 2016

(54) METHOD FOR PILOTING AN AIRCRAFT IN APPROACH PHASE

(75) Inventors: Franck Delaplace, Toulouse (FR); Martin Richter, Breme-Allemagne (DE); Dieter Lang, Stuhr-Allemagne (DE)

(73) Assignee: AIRBUS OPERATIONS SAS, Toulouse (FR)

(*) Notice: Subject to any disclaimer, the term of this patent is extended or adjusted under 35 U.S.C. 154(b) by 636 days.

(21) Appl. No.: 12/304,456

(22) PCT Filed: Jun. 7, 2007

(86) PCT No.: PCT/FR2007/000940
§ 371 (c)(1),
(2), (4) Date: Dec. 11, 2008

(87) PCT Pub. No.: WO2007/144485
PCT Pub. Date: Dec. 21, 2007

(65) Prior Publication Data
US 2009/0152403 A1    Jun. 18, 2009

(30) Foreign Application Priority Data
Jun. 13, 2006   (FR) .................................. 06 05237

(51) Int. Cl.
*G05D 1/00* (2006.01)
*B64C 9/28* (2006.01)
*G05D 1/06* (2006.01)

(52) U.S. Cl.
CPC .............. *B64C 9/28* (2013.01); *G05D 1/0676* (2013.01)

(58) Field of Classification Search
USPC ........................... 244/90 R, 183, 194; 701/4
See application file for complete search history.

(56) References Cited

U.S. PATENT DOCUMENTS

| | | | |
|---|---|---|---|
| 7,366,592 B2 * | 4/2008 | Delaplace et al. ................ | 701/4 |
| 2002/0099479 A1 | 7/2002 | Chatrenet | |
| 2007/0185628 A1 * | 8/2007 | Delaplace et al. ................ | 701/4 |
| 2009/0230253 A1 * | 9/2009 | Delaplace et al. .......... | 244/90 R |

FOREIGN PATENT DOCUMENTS

| | | | |
|---|---|---|---|
| EP | 1 498 794 | 1/2005 | |
| EP | 1498794 A1 * | 1/2005 | ............... G05D 1/00 |
| FR | 2 817 535 | 6/2002 | |

OTHER PUBLICATIONS

International Search Report dated Nov. 14, 2007 w/ English translation.
Written Opinion of the International Searching Authority with English translation.

* cited by examiner

*Primary Examiner* — Medhat Badawi

(57) ABSTRACT

According to the invention, high lift leading-edge slats (13) and high lift flaps (14) are simultaneously deployed, when the speed of the aircraft is equal to and less than an AES threshold.

10 Claims, 5 Drawing Sheets

METHOD FOR PILOTING AN AIRCRAFT IN APPROACH PHASE

The present invention relates to the piloting of an aircraft, in particular a civilian transport aircraft, in a landing phase in which said aircraft is moving on an approach level while losing speed before beginning the final descent to a runway. The invention relates more specifically to aircraft with wings that are provided with leading-edge high-lift slats and trailing-edge high-lift flaps, each of said slats and flaps being controllable to be able to assume either a retracted position or at least one extended position.

It is known that, before beginning such an approach level, the wings of the aircraft present a smooth configuration, without high lift, for which said slats and said flaps are retracted. Then, when the aircraft begins said approach level and when its speed falls below a first predetermined value, the pilot can, by acting on the control lever of the slats and the flaps, confer on the wings a first configuration, with very slight high lift, for which said slats are averagely extended and inclined, whereas said flaps remain retracted. Then, when the speed of the aircraft, which follows said approach level falls below a second predetermined value, less than the first, the wings assume a second configuration, with average high lift, for which said slats are averagely extended and inclined, as in said first configuration, and said flaps are averagely extended and inclined.

Thus, on said approach level, there is first of all a moderate extension of said slats, then a moderate extension of said flaps. The result is that the overall duration of the transition from the smooth configuration to said second configuration is at least equal to the sum of the duration of the extension of the slats and of the duration of the extension of the flaps.

If the extension of the slats and the extension of the flaps are slow, a long approach level must be provided, which can be a nuisance when it comes to air traffic.

However, if the extension of the slats and the extension of the flaps are rapid, the approach level can be shorter, but this requires, for said slats and flaps, very powerful, bulky and heavy hydraulic and/or electrical actuation means.

The object of the present invention is to speed up the transition from the smooth configuration to said second configuration, without the use of ultrapowerful, bulky and heavy actuation means for said slats and flaps.

To this end, according to the present invention, the method for piloting an aircraft moving on an approach level while losing speed before beginning the final descent to a runway, the wings of said aircraft being provided with leading-edge high-lift slats and trailing-edge high-lift flaps, said slats and flaps being controllable by a control lever to confer notably on said wings:

before said aircraft begins said approach level, a smooth configuration, without high lift, for which said slats and said flaps are retracted;

when said aircraft begins said approach level and when its speed falls below a first predetermined value, a first configuration, with very slight high lift, for which said slats are averagely extended and inclined, whereas said flaps remain retracted; and when said aircraft follows said approach level and when its speed falls below a second predetermined value less than said first value, a second configuration, with average high lift, for which said slats are averagely extended and inclined, as in said first configuration, and said flaps are averagely extended and inclined, is noteworthy in that:

there is automatically conferred on said wings of the aircraft, when said control lever is in a position corresponding to said first configuration and said aircraft crosses a first speed threshold greater than said second speed value, at least one intermediate configuration with slight high lift for which said slats are averagely extended and inclined, as in said first and second configurations, and the flaps are less extended than in said second configuration; and when said wings present said intermediate configuration and the speed of the aircraft increases instead of falling and crosses a second speed threshold greater than said first speed threshold, said flaps are automatically retracted for said wings to return to said first configuration.

Thus, thanks to the present invention, the flaps are partially extended while the slats are extended, such that the transition to the second configuration is speeded up. However, in the case where the speed of the aircraft increases to become greater than said second threshold, it is said first configuration that will be used.

Advantageously, said first speed threshold is close to said first predetermined speed value; preferably, it is greater than the latter.

Said second threshold, greater than said first threshold, provides a way of avoiding alternate extensions and retractions of said flaps in the case where the speed of the aircraft oscillates about said first threshold. This second threshold can be equal to the first threshold plus a few kts.

In said intermediate configuration, the extended flaps may or may not be inclined. If they are inclined, preferably they are inclined less than in said second configuration.

Such an intermediate configuration in which the flaps are extended and inclined can correspond to a standard configuration with slight high lift, used in certain take-off circumstances.

The figures of the appended drawing will clearly show how the invention can be implemented. In these figures, identical references denote similar elements.

Figure 1:
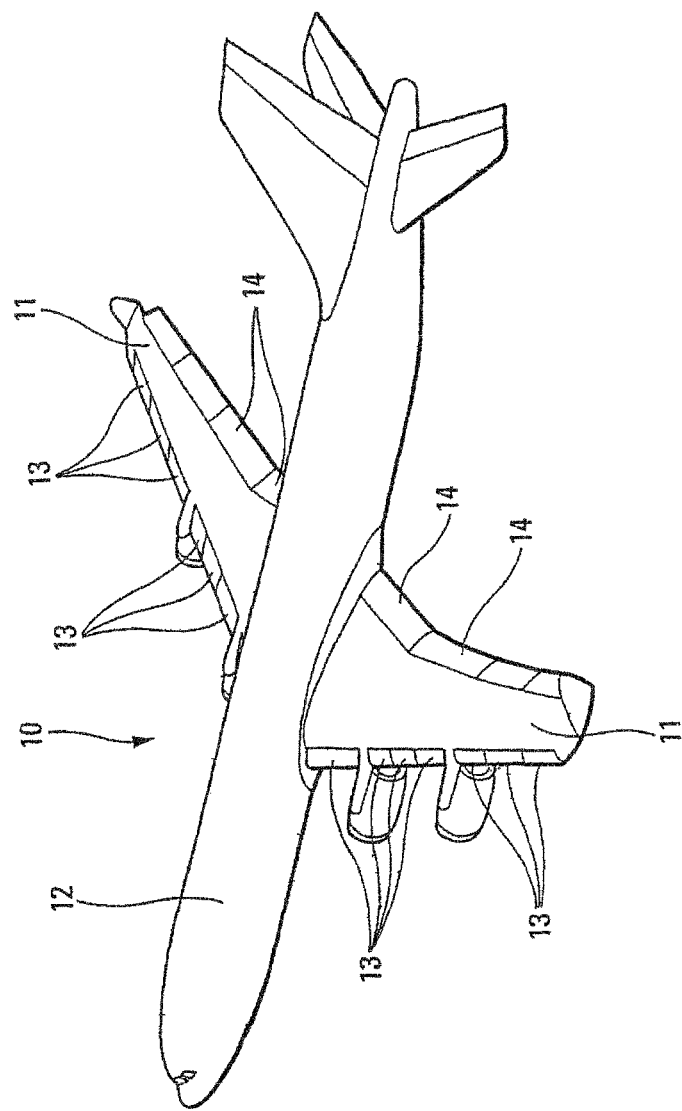
FIG. 1 is a perspective diagrammatic view from above of an airplane used to implement the method according to the present invention.
Figure 3:
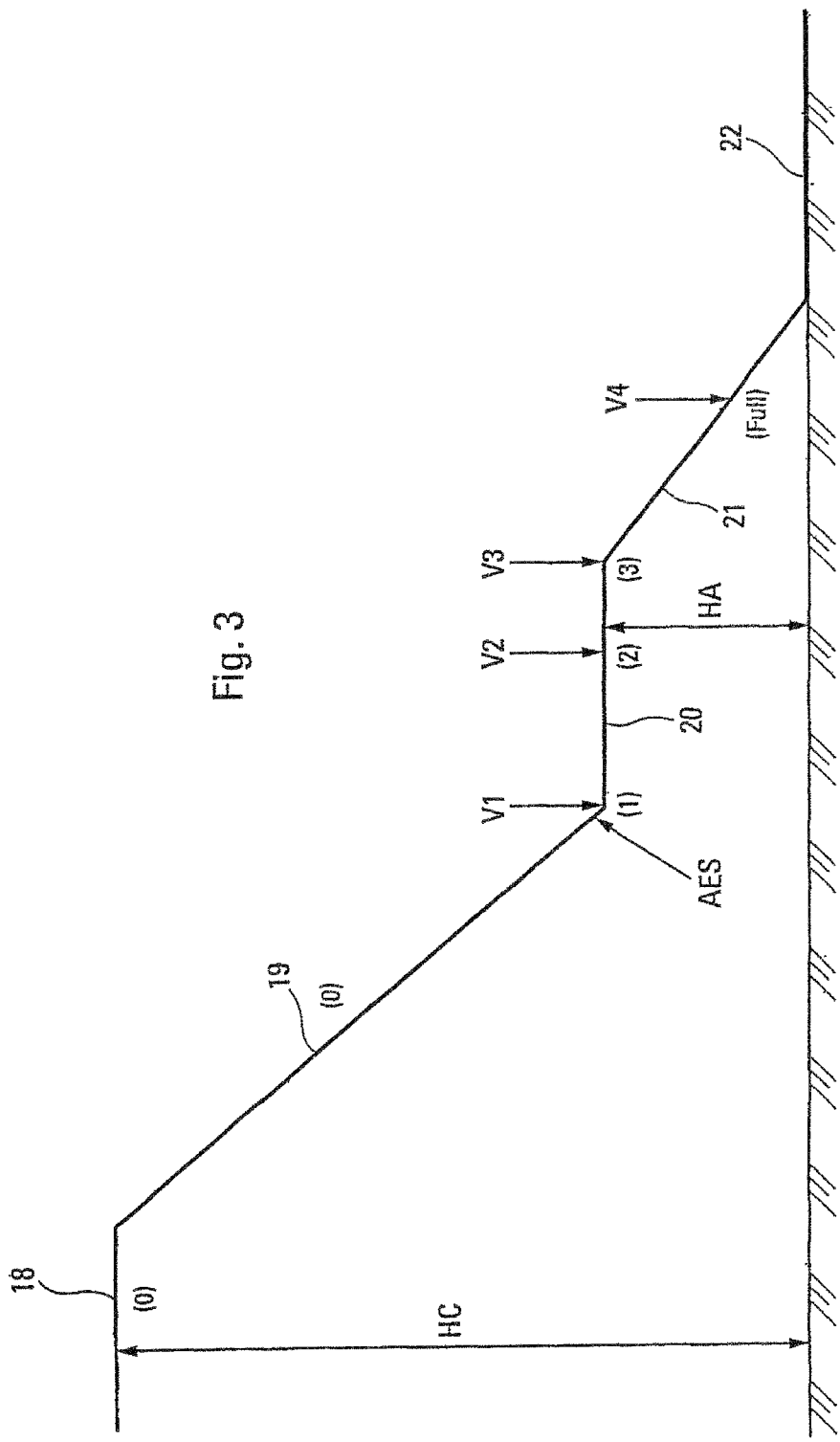

FIG. 3 diagrammatically illustrates a landing procedure of the airplane of FIG. 1.

Figure 4:
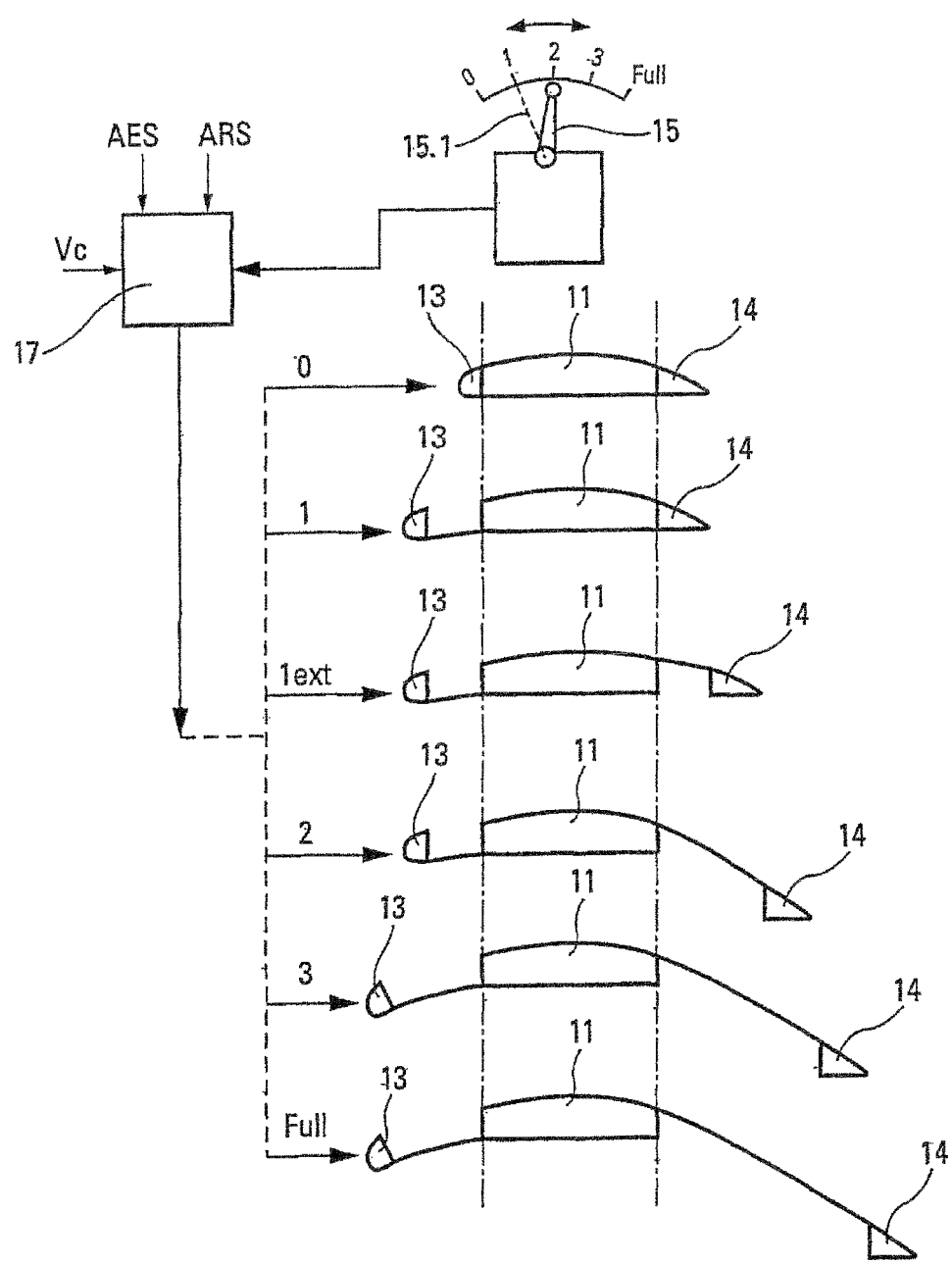
Figure 5:
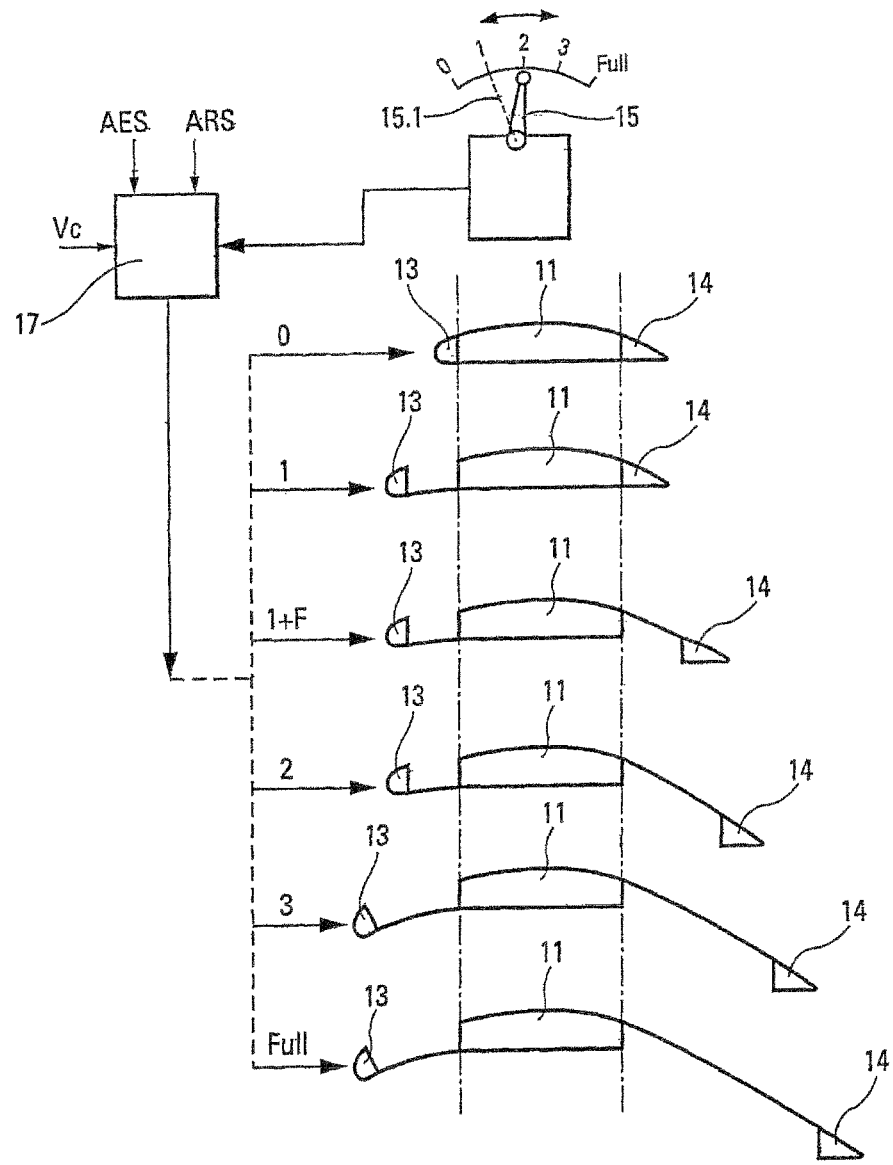

FIGS. 4 and 5 illustrate two exemplary intermediate landing configurations conforming to the present invention.

The civilian transport plane 10, of known type, represented in FIG. 1, comprises two wings 11 disposed symmetrically in relation to the fuselage 12 of said airplane.

Also in a known manner, said wings 11 are provided, among other aerodynamic control surfaces, with leading-edge high-lift slats 13 and trailing-edge high-lift flaps 14.

Figure 2:
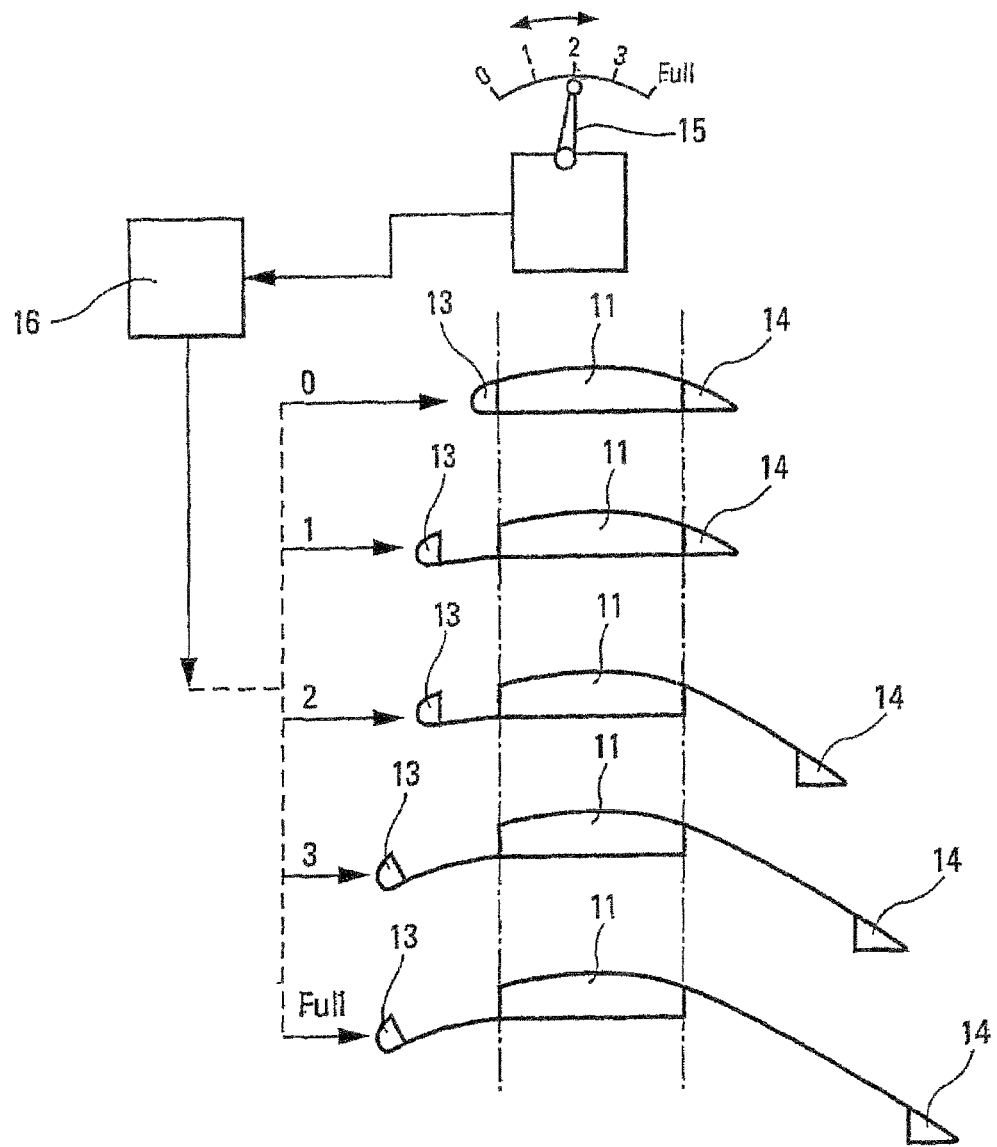
FIG. 2 illustrates various configurations of the wings of the airplane of FIG. 1.

The slats 13 and the flaps 14 are mobile and controllable by the action of the pilot of the airplane 10 on a lever 15 controlling control and actuation means 16 of said slats and flaps, as is diagrammatically represented in FIG. 2. The latter figure also illustrates that, generally, the lever 15 can assume five different positions, respectively referenced 0, 1, 2, 3 and Full, corresponding to five different configurations with the same references. Thus, as illustrated by FIG. 2:

when the lever 15 is in position 0, the corresponding configuration 0 of the wings 11 is smooth and without high lift, the slats 13 and the flaps 14 being fully retracted, forming an aerodynamic continuity with said wings 11;

when the lever 15 is in position 1 (see position 15.1 in FIGS. 4 and 5), the corresponding configuration 1 of the wings 11 has very slight high lift, the slats 13 being averagely raised forward of said wings and inclined relative to the latter, whereas the flaps 14 are fully retracted (as in configuration 0);

when the lever 15 is in position 2, the corresponding configuration 2 of the wings 11 has average high lift, the slats 13 being averagely raised forward of said wings and inclined relative to the latter (as in configuration 1), whereas the flaps 14 are also averagely raised backward of said wings and inclined relative to the latter;

when the lever 15 is in position 3, the corresponding configuration 3 of the wings 11 has very high lift, the slats 13 being fully raised forward of said wings and inclined relative to the latter, whereas the flaps 14 are very raised backward of said wings, in a more protruding and more inclined position than in the averagely raised position of configuration 2; and when the lever 15 is in the Full position, the corresponding Full configuration of the wings 11 has full high lift, the slats 13 being fully raised forward of said wings and inclined relative to the latter (as in configuration 3), whereas the flaps 14 are fully raised backward of said wings 11, in a more protruding and more inclined position than in the very raised position of configuration 3.

FIG. 3 diagrammatically illustrates the standard use of the various configurations described hereinabove when the airplane 10 is in approach and landing phase. As long as the airplane 10 is on its cruising trajectory 18, at cruising altitude HC, it is obvious that the configuration of the wings 11 is the smooth configuration without high lift 0. Said wings 11 retain this smooth configuration without high lift 0 while the airplane 10 follows its descent trajectory 19 towards the approach level 20, while losing speed.

On beginning the approach level 20, the pilot actuates the lever 15 for the wings 11 to assume the configuration 1 with very slight high lift, when the speed of the airplane 10 reaches a first predetermined value V1. Then, the airplane 10 continuing to lose speed on the approach level 20 of altitude HA, the pilot actuates said lever 15 for said wings 11 to change from the configuration 1 with very slight high lift to the configuration 2 with average high lift, such a transition taking place at a second predetermined speed V2, less than V1.

Then, the wings 11 change from the configuration 2 to the configuration 3, when the airplane 10 begins, at a third predetermined speed V3 less than V2, the final approach descent 21, then, at a fourth predetermined speed V4, less than V3, the pilot orders the transition from the configuration 3 to the Full configuration to land on the runway 22.

Thus, on the approach level 20, it can be seen that, initially, the slats 13 are raised to change from the retracted position of configuration 0 to the averagely raised position of configuration 1, then, next, the flaps 14 are raised to change from the retracted position of configurations 0 and 1 to the averagely raised position of configuration 2.

Obviously, the raising of the slats 13 and the raising of the flaps 14 are not instantaneous, but, on the contrary, the duration of each of them is several tens of seconds, for example 40 seconds.

The result is therefore that the time needed to change from the configuration 0 at the start of the approach level 20 to the configuration 2 at the end of the latter corresponds to the sum of said durations, or 80 seconds in the abovementioned example.

To reduce this time, in accordance with the present invention and as illustrated in FIG. 4 and FIG. 5, between the configurations 1 and 2, an intermediate configuration with slight high lift 1ext or 1+F is provided in which the slats 13 are averagely extended and inclined as in the configurations 1 and 2 and the flaps 14 are extended, but less than the configuration 2.

In the intermediate configuration 1ext of FIG. 4, the flaps 14 are simply extended backward, without inclination. On the other hand, in the intermediate configuration 1+F of FIG. 5, the flaps 14 are extended and inclined. This intermediate configuration 1+F can correspond to a standard take-off configuration with slight high lift of the airplane 10.

Moreover, in FIGS. 4 and 5, the control and actuation means of FIG. 2 are replaced by control and actuation means 17, receiving the speed Vc of the airplane 10, and speed thresholds AES and ARS. The first threshold AES is greater than the second predetermined speed V2 and, preferably, close to the first predetermined value V1 and, even slightly greater than the latter. The second threshold ARS is greater than the first threshold AES, by a few kts.

When the lever 15 is moved to position 15.1 corresponding to the configuration 1, and when the speed Vc of the airplane 10 becomes equal to and then less than the first threshold AES, the control and actuation means 17 control the slats 13 and the flaps 14 for the latter to assume the intermediate configuration 1ext or 1+F. If the first threshold AES is greater than the first predetermined value V1, the slats 13 and the flaps 14 assume said intermediate configuration without changing via the configuration 1. However, if the first threshold AES is less than said first predetermined value V1, said slats 13 and flaps 14 are first ordered to assume the configuration 1, then the intermediate configuration 1ext or 1+F.

Then, when the pilot controls the lever 15 and moves it to the position corresponding to the configuration 2, the wings 11 change from the intermediate configuration 1ext or 1+F to the configuration 2.

If, when the wings 11 are in the intermediate configuration 1ext or 1+F, the speed Vc of the airplane 10 increases (instead of continuing to decrease) to the second threshold ARS, said control and actuation means 17 order said flaps 14 to retract for said wings to return to configuration 1.

From the above, it will be noted that, under the action of the means 17 and when the lever 15 is in position 15.1, the transition from the configuration 0 or the configuration 1 to the intermediate configuration 1ext or 1+F and, conversely, any transition from the intermediate configuration to the configuration 1, are entirely automatic and cannot constitute an additional piloting workload for the pilot.

It will also be noted that, according to the present invention, it is possible to use together—and not only as variants—the two intermediate configurations 1ext and 1+F. For example, provision can be made, when the lever 15 is moved to position 15.1, for the wings 11 to change, under decreasing speed conditions, from the configuration 0 or from the configuration 1 first to the intermediate configuration 1ext, then to the intermediate configuration 1+F.

The invention claimed is:

1. A method for piloting an aircraft for approach to final descent, said aircraft being provided with wings having leading-edge high-lift slats and trailing-edge high-lift flaps, said slats and flaps being controllable by a control lever, wherein said method comprises the steps of:

maintaining said slats and said flaps in a retracted position prior to the approach to the final descent;

adjusting the aircraft to a first configuration as said aircraft begins said approach to the final descent and aircraft speed falls below a first predetermined speed value, wherein the first configuration is produced by both extending and inclining said slats from the retracted position, while maintaining the flaps in the retracted position;

adjusting the aircraft to a second configuration as said aircraft follows said approach to the final descent and aircraft speed falls below a second predetermined speed value that is less than said first speed value, wherein the second configuration is produced by both extending and inclining said flaps relative to the position of the flaps in the first configuration, while maintaining said slats substantially as in the position of the slats in said first configuration; and conferring on said wings, while said control lever is in a position corresponding to said first configuration and said aircraft crosses a first speed threshold greater than said second predetermined speed value, an intermediate configuration, wherein the intermediate configuration is produced by maintaining said slats in an extended and inclined position substantially as in said first and second configurations, and extending the flaps less than in said second configuration and greater than in said first configuration; and retracting the flaps to a configuration substantially as that of the first configuration while said wings are in said intermediate configuration and aircraft speed crosses a second speed threshold greater than said first speed threshold.

2. The method as claimed in claim 1, wherein said first speed threshold is substantially equal to said first predetermined speed value.

3. The method as claimed in claim 1, wherein said first speed threshold is greater than said first predetermined speed value.

4. The method as claimed in claim 1, wherein said second speed threshold is greater than said first speed threshold.

5. The method as claimed in claim 1, wherein, in said intermediate configuration, said flaps are extended, but not inclined.

6. The method as claimed in claim 1, wherein, in said intermediate configuration, said flaps are extended and inclined.

7. The method as claimed in claim 6, wherein, in said intermediate configuration, said flaps are less inclined than in said second configuration.

8. The method as claimed in claim 6, wherein said intermediate configuration corresponds to a take-off configuration of the aircraft.

9. An aircraft, controlled according to the method of claim 1.

10. The method as in claim 1, wherein the first speed threshold is both greater than said second predetermined speed value and substantially equal to or greater than said first speed value.

* * * * *

UNITED STATES PATENT AND TRADEMARK OFFICE
CERTIFICATE OF CORRECTION

PATENT NO. : 9,457,888 B2
APPLICATION NO. : 12/304456
DATED : October 4, 2016
INVENTOR(S) : Frank Delaplace et al.

It is certified that error appears in the above-identified patent and that said Letters Patent is hereby corrected as shown below:

Item (73) Assignee, incorrectly reads:
"Airbus Operations SAS,
Toulouse (FR)"

Should read:
"Airbus Operations SAS,
    Toulouse (FR)
Airbus Operations GmbH,
    Hamburg (DE)"

Signed and Sealed this
Tenth Day of January, 2017

Michelle K. Lee
*Director of the United States Patent and Trademark Office*